US009942322B1

(12) United States Patent
Reddy et al.

(10) Patent No.: US 9,942,322 B1
(45) Date of Patent: Apr. 10, 2018

(54) CALL LOG UPDATE ACROSS MOBILE DEVICE AND WEBRTC CLIENT DEVICE

(71) Applicant: T-Mobile USA, Inc., Bellevue, WA (US)

(72) Inventors: Ravikiran Reddy, Bellevue, WA (US); Venkata Kondeti, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/482,194

(22) Filed: Apr. 7, 2017

(51) Int. Cl.
*H04M 3/42* (2006.01)
*H04L 29/08* (2006.01)
*H04W 4/00* (2018.01)
*H04L 29/06* (2006.01)
*H04M 1/725* (2006.01)

(52) U.S. Cl.
CPC ...... *H04L 67/1095* (2013.01); *H04L 65/1059* (2013.01); *H04L 67/1097* (2013.01); *H04L 67/26* (2013.01); *H04M 1/72522* (2013.01); *H04M 1/72583* (2013.01); *H04W 4/001* (2013.01); *H04M 2250/60* (2013.01)

(58) Field of Classification Search
CPC .......... H04L 67/1095; H04L 67/1097; H04L 65/1059; H04L 67/26; H04M 1/72522; H04M 1/72583; H04M 2250/60; H04W 4/001
See application file for complete search history.

(56) References Cited

U.S. PATENT DOCUMENTS

| 7,839,987 | B1 * | 11/2010 | Kirchhoff | ........ | H04M 3/42195 379/142.01 |
| 8,000,683 | B2 * | 8/2011 | Linkert | ............ | H04M 1/72519 455/412.1 |
| 9,338,652 | B1 * | 5/2016 | Allen | .................... | H04W 12/06 |
| 2006/0140173 | A1 * | 6/2006 | Hoover | ............... | H04M 3/2218 370/352 |
| 2006/0199567 | A1 * | 9/2006 | Alston | .............. | H04M 1/72552 455/412.1 |
| 2008/0214143 | A1 * | 9/2008 | Heit | ................... | G06Q 10/0637 455/405 |
| 2014/0324979 | A1 * | 10/2014 | Gao | ........................ | G06F 17/00 709/204 |
| 2014/0341366 | A1 * | 11/2014 | Phelps | ................ | H04M 3/5191 379/265.09 |
| 2015/0056977 | A1 * | 2/2015 | Wisnosky | ......... | H04M 1/72566 455/418 |

(Continued)

*Primary Examiner* — Ajit Patel
(74) *Attorney, Agent, or Firm* — Lee & Hayes, PLLC

(57) ABSTRACT

Systems, methods, and applications for providing consolidated call logs for both cellular and internet calls. The application (or, "app") can retrieve (pull), or push, information from a cellular call log to a web real-time communications (WebRTC) call log, and vice-versa. The applications can retrieve call log information from a WebRTC client, for example, and then push this information to user equipment (UE) using a suitable messaging protocol. The app can also retrieve the cellular call log from the call log on the UE, or from cloud-based storage, and push it to the WebRTC client. A consolidated call log can be provided that provides all calls (i.e., cellular- and web-based calls) in a single log. The consolidated call log can also include tabs, or other features, to enable the calls to be displayed separately by source.

18 Claims, 8 Drawing Sheets

(56) References Cited

U.S. PATENT DOCUMENTS

2015/0180748 A1\* 6/2015 Ding ................... H04L 41/046
                                                              709/224
2016/0219083 A1\* 7/2016 Gangadharan ...... H04L 65/1069
2016/0330252 A1\* 11/2016 Stahl ................... H04L 65/608

\* cited by examiner

CALL LOG UPDATE ACROSS MOBILE DEVICE AND WEBRTC CLIENT DEVICE

BACKGROUND

Cellular and Internet enabled devices are ubiquitous. People use "smart" phones, tablets, laptops, and other electronic devices (collectively, user equipment, or "UE") for cellular calls, Internet browsing, global positioning system (GPS) and cellular location services, among other things. Many UEs include multiple applications (or, "apps") that enable users to, for example, keep a calendar, play games, manipulate images, and set reminders.

Many UE are capable of connecting to multiple networks and types of networks. A cellular phone, for example, may be capable of connecting to current fourth generation, 4G or 4G LTE, connections. These devices are generally also able to connect to legacy third generation, or 3G, networks. In this manner, when the user is in a rural location, for example, that has only 3G connectivity, the UE can still provide a cellular and/or data connection, albeit generally at a reduced connection speed.

In addition to multiple cellular connections, many UE are also capable of connecting to the Internet via, for example, a cellular data connection, wireless (or Wi-Fi connection), or Ethernet connection. In this manner, users may be able to browse the Internet, make internet-based calls (as opposed to cellular calls), and use other online features. Thus, at any given time, the UE may use a cellular voice connection for cellular calls, for example, a cellular data connection for Internet browsing, and a Wi-Fi connection for web-based voice or video calls.

DETAILED DESCRIPTION

Examples of the present disclosure can comprise systems and methods for updating call logs on user equipment (UE) across multiple platforms. The system can include an application (or, app) installed on the UE and in communication with network servers on multiple types of networks. The app can gather call log data, and other information, from web real-time communications (WebRTC) servers, for example, cloud based storage servers, onboard call logs, and other entities to update and synchronize call logs between the UE and the various servers.

To simplify and clarify explanation, the system is described below as an app for synchronizing (syncing) call logs between cellular calls and internet-based WebRTC calls. One of skill in the art will recognize, however, that the system is not so limited. Thus, the system could also providing syncing across other communications platforms such as, for example, internet-based voice or video calling, online chat, or landline based calling. Similarly, while described below for use with cellular communications systems, the system could also be used with other types of wireless communications systems; or indeed, any time UEs provide communications (e.g., voice or video calling) across multiple platforms. The system enables call logs on multiple platforms to be synched and, indeed, for a single "master" call log to be compiled and updated.

Figure 1:
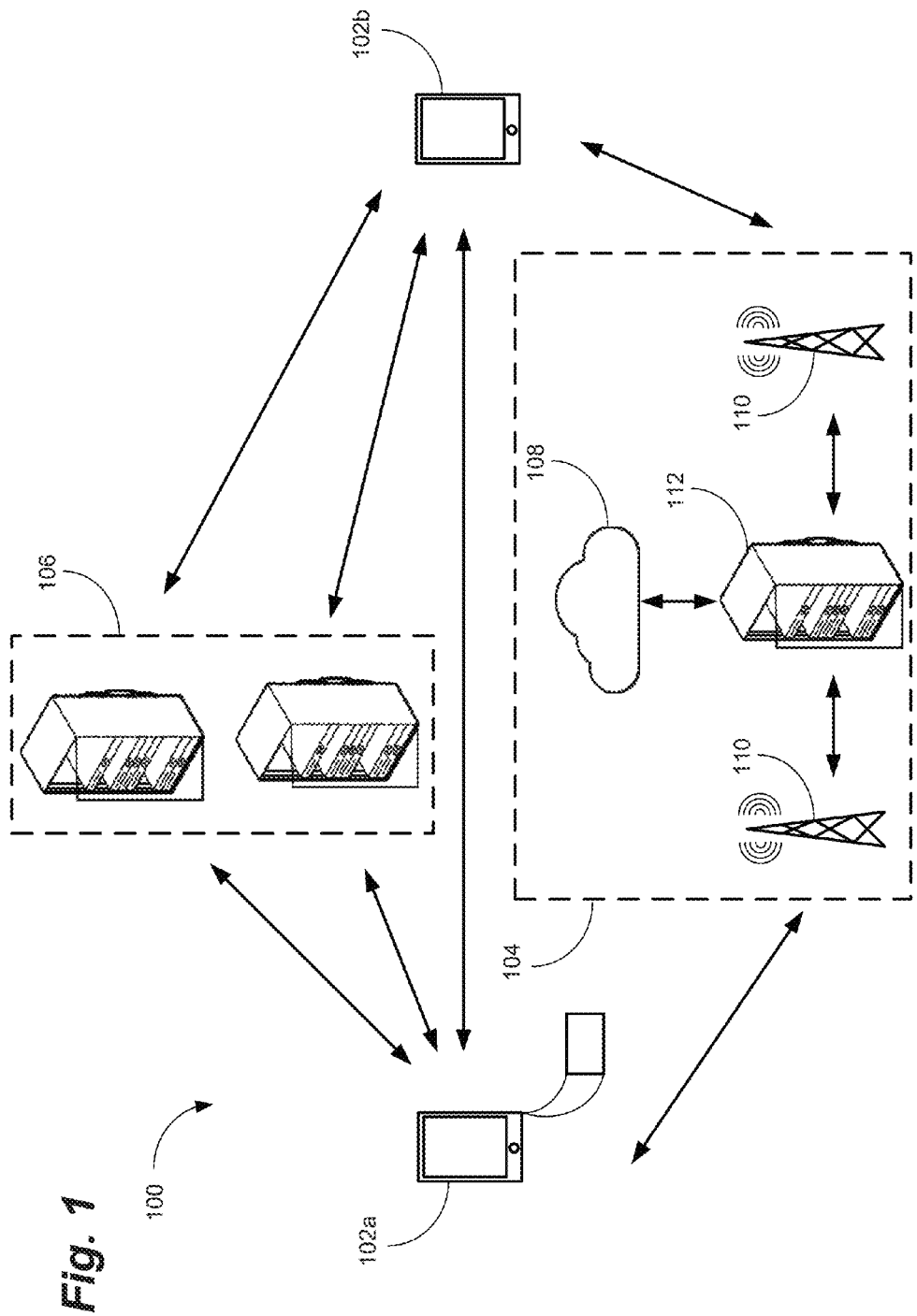
FIG. 1 is a schematic view of a user equipment (UE) connected to a cellular based communication system and an internet based communication system, with a bridging application, in accordance with some examples of the present disclosure.

As shown in FIG. 1, examples of the present disclosure can comprise systems 100 and methods for syncing call activity between multiple platforms. In some examples, as shown, the system 100 can take the form of an app 102a installed on a UE 102, though some or all of the system 100 can also be web-based and executed by a remote server, or otherwise executed. The system 100 can enable call log, and other data, associated with both a cellular network 104 and a WebRTC network 106 to be downloaded, compiled, and synched between both platforms to ensure users have accurate call records in a convenient form on the UE 102 or multiple UEs 102 associated with the same account or phone number.

FIG. 1 includes the basic components of the cellular network 104 and the WebRTC network 106. These networks 104, 106 are discussed in greater detail below with reference to FIGS. 1B and 1C, respectively. As mentioned above, and shown in FIG. 1, many UE 102 are capable of connecting to multiple types of networks that provide a variety of services. On the communication front alone, users can communicate using voice and data connections over cellular network 104 and/or using internet-based voice and/or video calls over internet-based networks, such as the WebRTC network 106 (or, Skype, among others).

In general, however, calls made using the cellular network 104 are logged in a call log internal to the UE 102, which may also be stored in cloud storage 108 for backup. In this manner, if the UE 102 must be reset, for example, some or all of the call log can be recovered. Calls made over the cellular network 104 may be routed from a first UE 102a through one or more cell towers 110, across the cellular "backbone" via one or more servers 112 (e.g., a third generation partnership project authentication authorization and accounting, or 3 GPP AAA, server), switches, and routers through one or more additional cell towers 110 to the recipient UE 102b (i.e., if the recipient is also on a cell phone). Of course, calls made to land lines, or other types of UE 102, may include additional or different connections.

WebRTC, on the other hand, facilitates calls directly through a web browser on the UE 102. As a result, WebRTC generally does not require a separate application or plugin, but may use a WebRTC client on the UE 102. Calls made using the WebRTC network 106, however, are not generally not logged in the call log of the UE 102. Indeed, WebRTC calls can be logged by one or more components of the WebRTC network 106, the WebRTC client, or perhaps in the browser history of the UE 102, but often are not logged at all. Thus, the call log on the UE 102 does not include WebRTC calls and vice-versa.

Unfortunately, at present, there is no connection, or other means, to consolidate this information. In other words, there is no connection, for example, between the cloud storage 108 and the WebRTC network 106. Thus, the call log for cellular calls on the UE 102 includes on those calls made over the cellular network 104. The calls made over the WebRTC network 106 may not be logged at all or may be stored on a component of the WebRTC network 106, such as a remote server database.

To this end, it would be useful to have systems and methods to download, compile, and disseminate these disparate call logs. Because the UE 102 is the common denominator between the cellular network 104 ad the WebRTC network 106, for example, the app 102a on the UE 102 can be used to retrieve call log information from the cloud storage 108 or the call log on the UE 102 for cellular calls and one or more components on the WebRTC network 106 for WebRTC calls. It is to such systems and methods that examples of the present disclosure are primarily directed.

Figure 2:
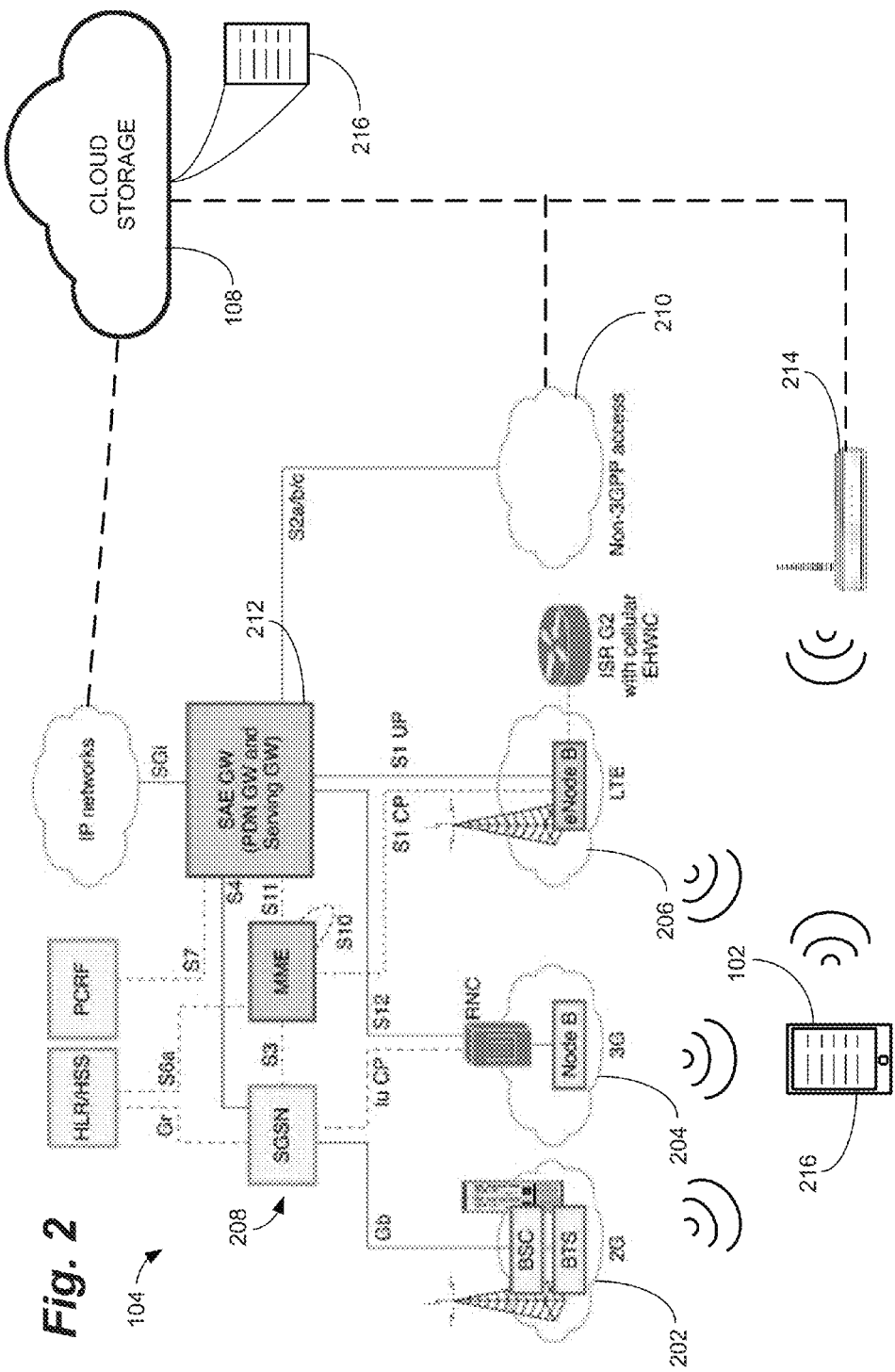
FIG. 2 is a detailed schematic view of the UE connected to a cellular based communication system, in accordance with some examples of the present disclosure.

FIG. 2 depicts a UE 102 in communication with a conventional cellular network 104 including 2G 202, 3G 204, and 4G LTE 206 components. Of course, future technologies, such as, for example, 5G and device-to-device (D2D) components could also be included and are contemplated herein. As is known in the art, data can be routed from the internet or other sources using a circuit switched modem connection (or non-3GPP connection) 208, which provides relatively low data rates, or via IP based packet switched 210 connections, which results is higher bandwidth. The LTE system 206, which is purely IP based, essentially "flattens" the architecture, with data going straight from the internet to the Service Architecture Evolution Gateway (SAE GW) 212 to evolved Node B transceivers 206, enabling higher throughput.

Many UE 102 also include additional connectivity such as Wi-Fi (e.g., 802.11x) internet connections via a Wi-Fi router 214. In many cases, UE 102 may be able to make voice calls via a Wi-Fi connection when the user is at home, for example, and then connect to, or transition, to the cellular network 104 when traveling. In many cases, the Wi-Fi router 214 can provide higher data rates, for example, than a cellular connection.

In some examples, the cellular network 104 can also include cloud storage 108. The cloud storage 108 can be used as a back-up device for data stored on the UE 102, including the cellular call log 216, user contacts, calendars, and other functions. The cloud storage 108 can include one or more servers in communication with the UE 102 via a cellular and/or Wi-Fi data connection. This can enable the UE 102 to store a backup of the call log, pictures, music, and other data "in the cloud." If a UE 102 needs to be reset, reloaded, or replaced, therefore, the user's preferences and data, including the cellular call log 216, can be restored to the UE 102. The cellular call log 216 can include call history information such as, for example, phone numbers, call times, call durations, missed calls, etc. for cellular based calls.

Figure 3:
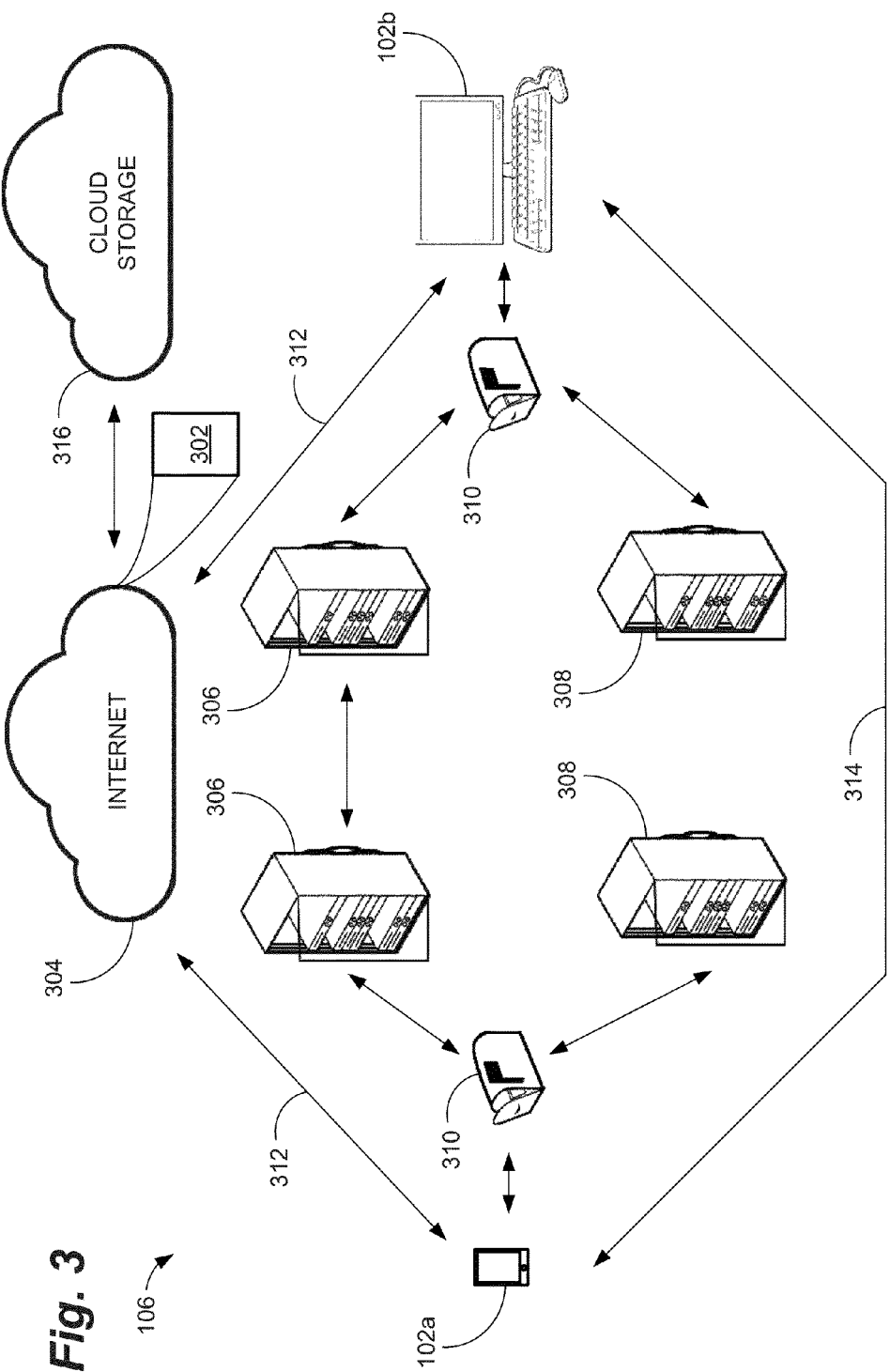
FIG. 3 is a detailed schematic view of the UE connected to an internet based communication system, in accordance with some examples of the present disclosure.

As shown in FIG. 3, and mentioned above, many UE 102 also include a connection to the internet 304. This can be via the cellular network 104 via a cellular data connection or via a wired or wireless internet connection (e.g., via the Wi-Fi router 214). This can enable users to search and browse the internet, watch videos, and make voice and video calls using, for example, voice over internet protocol (or, "VoW"), Skype, or WebRTC application 302. As shown, the WebRTC application 302 can utilize, for example, an internet connection 304, one or more traversal using relays around network address translators servers (or, "TURN servers") 308, one or more session traversal of user datagram protocol through network address translators server (or, "STUN servers") 306, and one or more network address translators (or, "NATs") 310.

To establish a WebRTC call, the UEs 102a, 102b must first establish communications via the internet connection 304 using suitable signaling 312. Signaling 312 includes the process of coordinating communication between the UEs 102a, 102b. To establish a "call," the WebRTC application 302 needs to exchange information between the clients for each UE 102. This can include session control messages used to open or close communication, error messages, media metadata such as codecs and codec settings, bandwidth and media types, key data, used to establish secure connections, and network data, such as a host's IP address and port as seen by the outside world, among other things.

In its simplest form, every WebRTC endpoint (e.g., UE 102a) has a unique address that it can exchange with other peers (e.g., UE 102b) to enable direct communication. In this configuration, a direct peer-to-peer (or, "P2P") connection 314 can be established between the UEs 102a, 102b. This can enable the UEs 102 to exchange files, conduct voice or video calls, etc.

In most cases, however, each UE 102 is behind one or more layers of NATs 310. This can include have anti-virus software that blocks certain ports and protocols. This can also include various proxies and firewalls. In some cases, a firewall and NAT can be provided by the same device, such as the Wi-Fi router 214.

In this configuration, the WebRTC application 302 can use a STUN server 306 to enable the NATs 310 (e.g., UEs 102 behind a firewall) to setup phone calls. In this manner, the WebRTC application 302 can include, for example, a VoIP provider hosted outside of the local network. To this end, a STUN server 306 enables each UE 102a, 102b to obtain an external IP address (e.g., outside the firewall) to establish the P2P connection 314.

In some cases, due to firewall, antivirus, or other settings, it may not be possible to establish the P2P connection 314, even when using the STUN server 306. In this case, the TURN server 308 can be employed. The TURN server 308 can comprise a general-purpose network traffic TURN server and gateway to relay the stream between the UEs 102. TURN servers 308 generally have public IP addresses and, as a result, can be contacted by the UEs 102 even if, for example, the UEs 102 are behind firewalls or proxies. Thus, the TURN servers 308 act as conduits through which the media passes to the UEs 102.

One or more of the STUN server 306, the TURN server 308, or a separate server, such as a WebRTC database server 316 (sometimes referred to as "mStore") may store call log information for WebRTC (the "WebRTC call log 318") including, for example, the recipient's phone number or IP address, call time and duration, missed calls, etc. Unfortunately, at present, there is no way to combine the WebRTC call log 318 information stored on the WebRTC database server 316 and the cellular call log 216 on the UE 102 (or in the cloud storage 108).

Figure 4:
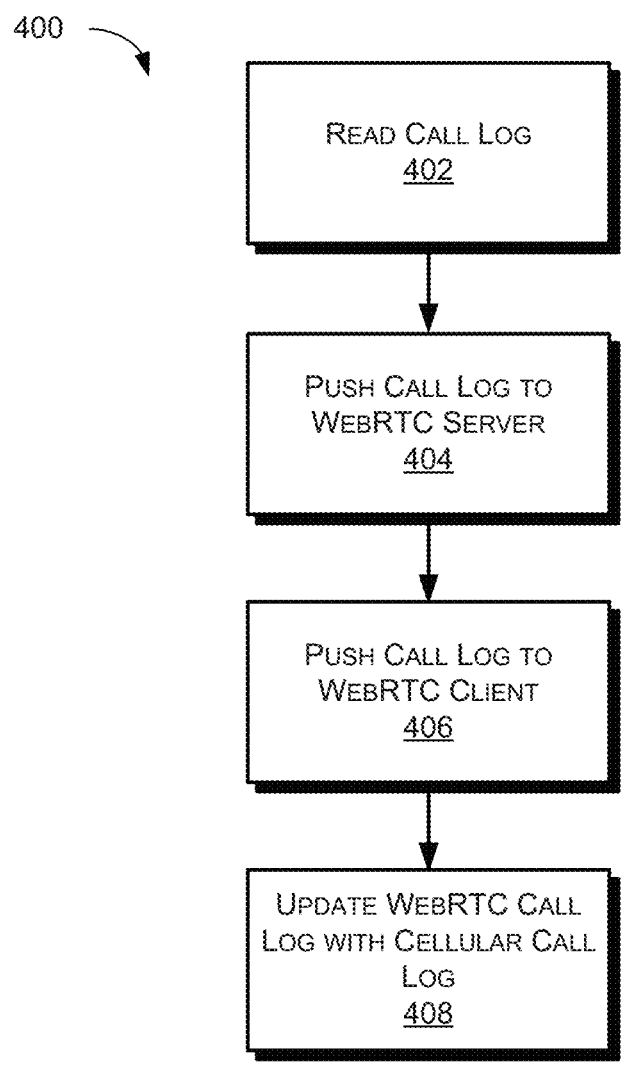
FIG. 4 is a flowchart depicting an example of a method for providing a cellular call log to a web real time communications (WebRTC) client, in accordance with some examples of the present disclosure.
Figure 5:
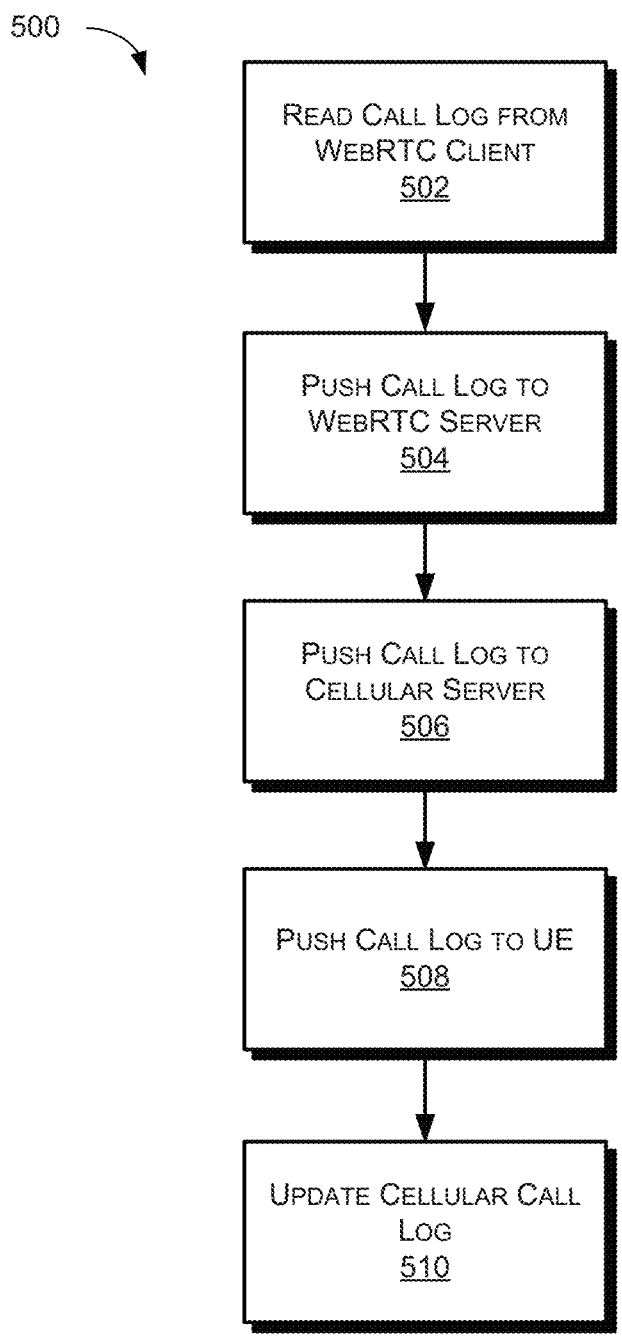
FIG. 5 is a flowchart depicting an example of a method for providing a WebRTC call log to the UE, in accordance with some examples of the present disclosure.

To this end, examples of the present disclosure can comprise methods to combine this information into a single, complete call log. As shown in FIG. 4, in some examples, this can comprise providing the cellular call log 216 on the UE 102 to the WebRTC database server 316. At 402, therefore, the app 102a can read the information stored in the cellular call log 216. As discussed above, this can include phone numbers, call times and duration, call type (e.g., incoming, outgoing, missed, etc.), and other information.

At 404, the app 102a can "push" the call log information to the WebRTC database server 316. In some examples, the call log can be sent to the WebRTC database server 316 using a suitable communications protocol such as, for example, the internet message access protocol (IMAP). At 406, the WebRTC database server 316 can provide the call log information to the WebRTC network 106, such as a WebRTC client on the UE 102. Indeed, in some examples, the call log can be provided to any UE 102 associated with the same number or IP address. In this manner, the call log can be synced across multiple platforms and multiple UEs 102. Thus, using the method 400 the call log from the UE 102 can be sent to the call log on the WebRTC network 106.

At 408, the WebRTC client can update the WebRTC call log 318 to include the cellular call log 216. In some examples, this can include extracting the information from a file, decrypting, or otherwise making the data usable. In some examples, the WebRTC call log 318 may have more or less data categories than the cellular call log 216. In this configuration, the WebRTC client can remove unneeded data or fill unused slots with "empty" or similar to prevent errors.

Having updated the call log on the WebRTC network with the cellular call log, examples of the present disclosure call also comprise a method 500 for updating the cellular call log 216 on the UE 102 and/or in the cloud storage 108 with the WebRTC call log 318. At 502, the WebRTC client (or the app 102a) can read the WebRTC call log 318. This may be stored on the WebRTC client itself, or on the WebRTC database server 316, among other things. At 504, the WebRTC client can push the WebRTC call log 318 to the WebRTC database server 316.

At 506, the WebRTC database server 316 can then push the WebRTC call log 318 to the cellular network 104 using a suitable protocol such as, for example, sequenced packet protocol (SPP). The WebRTC call log 318 can be received by an appropriate component of the cellular network such as, for example, an Apple Push Notification Service (APNS) server or a Google Cloud Messaging (GCM) server, and then transferred to the UE 102.

To this end, at 508, depending on the type of OS running on the UE 102 (e.g., Apple's IOS or Google's Android), the APNS server or GCM server can use and appropriate protocol to transfer the WebRTC call log 318 to the cellular call log 216. For IOS devices, for example, the method 500 may use the aforementioned APNS. For Android devices, on the other hand, the method 500 can use Google Cloud Messaging (GCM).

At 510, the app 102a on the UE 102 can receive the data associated with the WebRTC call log 318. The app 102a can then combine the WebRTC call log 318 and the cellular call log 216 to create a complete call log on the UE 102. In other words, the call log on the UE 102, which already included all cellular calls, now includes all WebRTC calls as well.

In some examples, the methods 400, 500 can be performed in real-time, or substantially real-time. So, for example, the call logs 216, 318 can be synced as soon as a call is ended (i.e., as quickly as network traffic will allow). In other examples, the call logs 216, 318 can be synced at predetermined intervals (e.g., every minute, 15 minutes, 30 minute, or hour). In some examples, the app 102a can enable the user to set the frequency of the sync via a user interface.

Figure 6:
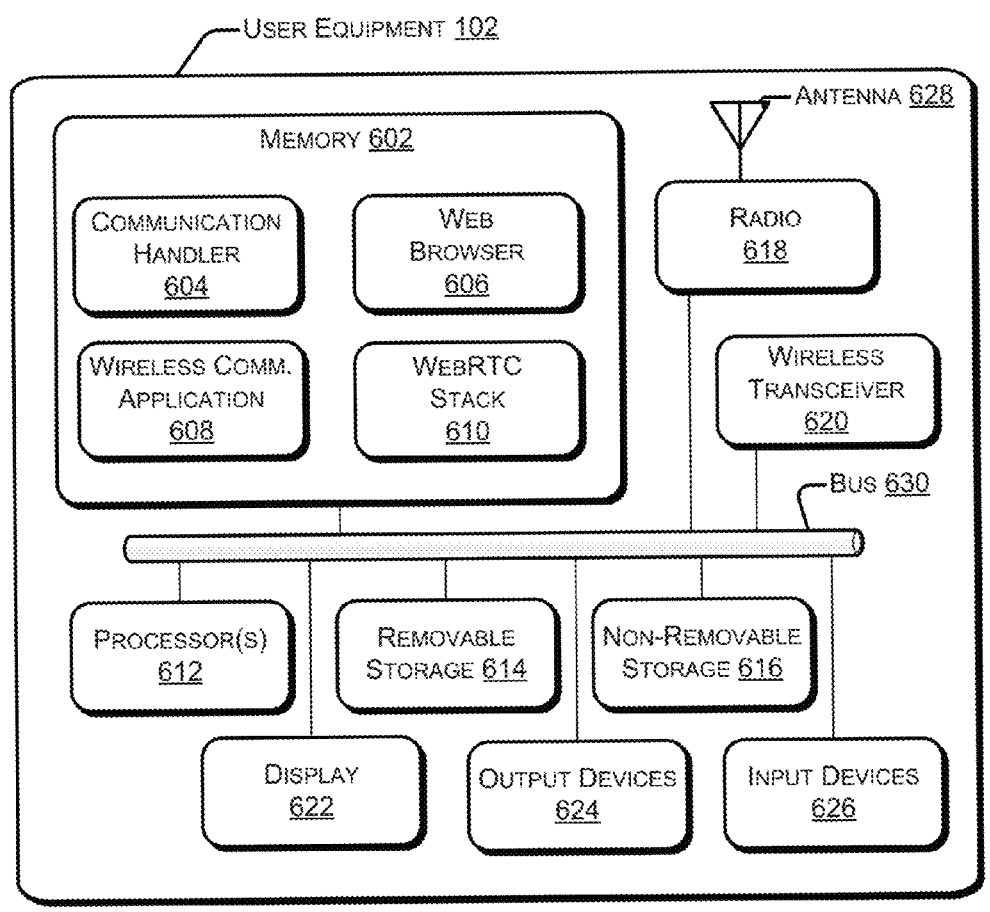
FIG. 6 is an example UE for use with the methods of FIGS. 4 and 5, in accordance with some examples of the present disclosure.

FIG. 6 illustrates a component level view of the UE 102 configured with a communication client to engage in both the WebRTC network 106 and the cellular network 104. As illustrated, the UE 102 comprises a system memory 602 storing a communication handler 604, a web browser 606, a wireless communication application 608, and a WebRTC stack 610. Also, the UE 102 includes processor(s) 612, a removable storage 614, a non-removable storage 616, a radio 618, a wireless communication transceiver 620, a display 622, output device(s) 624, input device(s) 626, and one or more antenna(s) 628 connected to the radio 618. The processor 612, radio 618, system memory 602, and other illustrated components of UE 102 can be communicatively coupled via bus 630, e.g., a PCI or other computer bus.

In various examples, system memory 602 is volatile (such as random access memory, or RAM), non-volatile (such as read only memory, or ROM, flash memory, etc.) or some combination of the two. The communication handler 604 stored in the system memory 602 may enable the UE 102 to initiate and receive WebRTC calls, such as voice calls, video calls, and messaging over, e.g., a wireless or cellular data network. The communication handler 604 may be an example of the WebRTC clients described further herein. It may present user interfaces, receive user input, store the WebRTC call log 318, and communicate with various server(s) 112, 306, 308.

The web browser 606 may be an example of the communication clients described further herein. It may communicate with the server(s) 112, 306, 308 through the WebRTC stack 610 or through other communication stack(s) and may present user interfaces and receive user input. The web browser 606 may communicate with the server(s) 112, 306, 308 over an IP network, such as a cellular, wireless (e.g., Wi-Fi), or wired network.

The wireless communication application 608 may, as described further herein, be downloaded from server(s) 112, 306, 308. The wireless communication application 608 may be an example of the communication clients also described further herein. It may communicate with the server(s) 112, 306, 308 through the WebRTC stack 610, through an IMS stack, or through other communication stack(s) and may present user interfaces, store the cellular call log 216, and receive user input, among other things. The wireless communication application 608 may communicate with the server(s) 112, 306, 308 over an IP network, such as a wireless or wired network. In some examples, after a logout from a user account, the wireless communication application 608 may be automatically deleted from the UE 102.

The WebRTC stack 610 may enable a web browser 606, wireless communication application 608, or other communication client to communicate with server(s) 112, 306, 308 and engage in WebRTC. In some examples, the communication handler 604 and/or wireless communication application 608 may also enable the UE 102 to communicate via the cellular network 104. The wireless communication application 608 can connect to the cellular network 104 via the radio 618, for example.

In some examples, the processor(s) 612 is a central processing unit (CPU), a graphics processing unit (GPU), both CPU and GPU, or any other sort of processing unit. Example processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and processors incorporating more than one type of device (e.g., a CPU and an FPGA on a single die).

UE 102 may also include additional data storage devices (removable and/or non-removable) such as, for example, magnetic disks, optical disks, or tape. Such additional storage is illustrated in FIG. 6 by removable storage 614 and non-removable storage 616. Tangible computer-readable media may include volatile and nonvolatile, removable and non-removable media implemented in any method or technology for storage of information, such as computer readable instructions, data structures, program modules, or other data. System memory 602, removable storage 614, and non-removable storage 616 are all examples of computer-readable storage media. Computer-readable storage media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other medium which can be used to store the desired information and which can be accessed by the UE 102. Any such tangible computer-readable media may be part of the UE 102, such as integrated memory chips.

In some examples, the radio 618 includes any sort of radio known in the art. For example, radio 618 may be a radio transceiver that performs the function of transmitting and receiving radio frequency communications. The radio interface may facilitate cellular connectivity between the UE 102 and various cell towers, base stations, and/or access points of access networks via, for example, packet-switched or circuit-switched networks.

The wireless communication transceiver 620 may be any sort of component enabling connectivity to wireless access networks, such as a wireless modem or a near field antenna. Such wireless access networks, including Wi-Fi or Wi-Max access networks, may utilize unlicensed spectrum. The UE 102 may connect to other devices through the radio 618 or wireless communication transceiver 620 alternatively or at the same time.

In various examples, the display 622 is a liquid crystal display, organic light-emitting diode (OLED) display, or any other type of display commonly used in telecommunication devices. For example, display 622 may be a touch-sensitive display screen, and can then also act as an input device or keypad, such as for providing a soft-key keyboard, navigation buttons, or the like.

In some examples, the output devices 624 include any sort of output devices known in the art, such as a display (already described as display 622), speakers, a vibrating mechanism, or a tactile feedback mechanism. Output devices 624 also include ports for one or more peripheral devices, such as headphones, peripheral speakers, or a peripheral display.

In various examples, input devices 626 include any sort of input devices known in the art. For example, input devices 626 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 7:
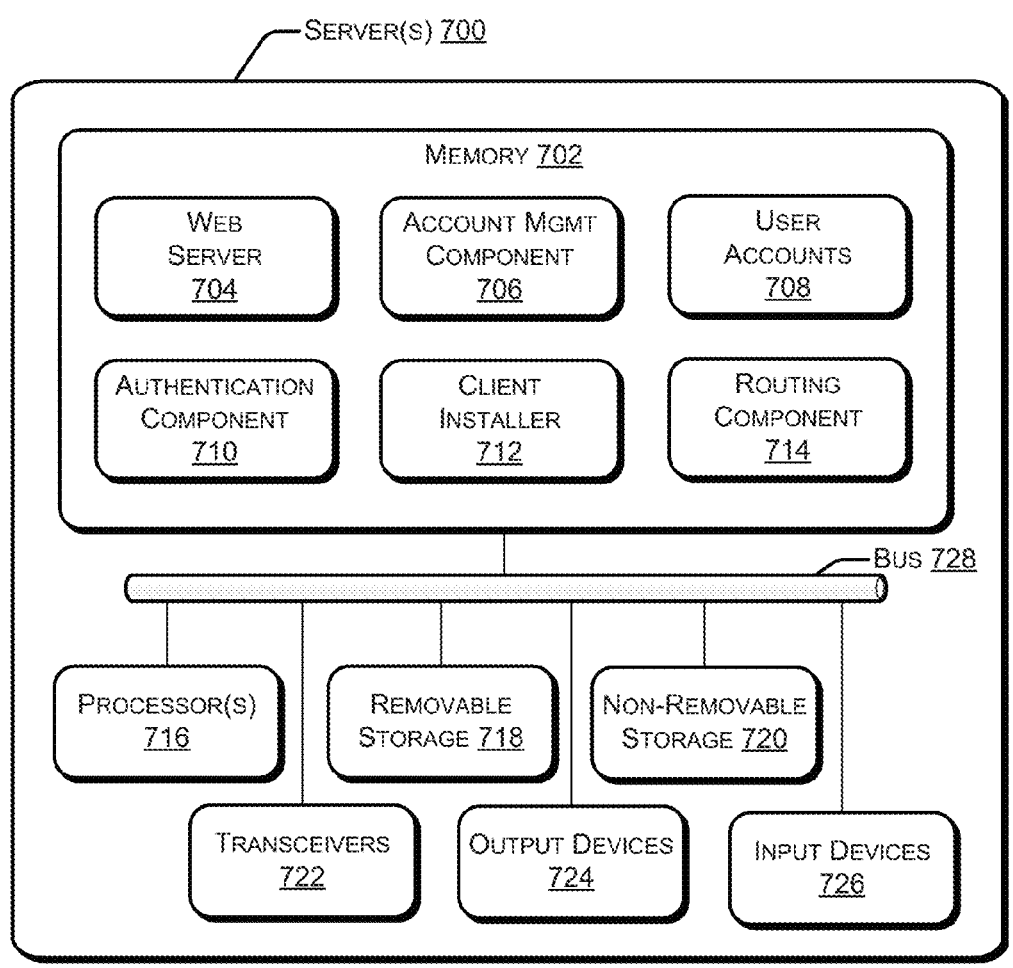
FIG. 7 is an example of a cellular or WebRTC database server, in accordance with some examples of the present disclosure.

FIG. 7 illustrates a component level view of server(s) of a telecommunication network server, the server(s) being configured to manage access to user accounts, provide real-time communication services, and provide downloads of wireless communication applications. Server(s) 700 may be example(s) of the telecommunication network server(s) 116, STUN servers 306, TURN servers 308, or cloud storage 108, 316.

As illustrated, the server(s) 700 comprises a system memory 702 storing a web server 704, an account management component 706, user accounts 708, an authentication component 710, a client installer 712, and a routing component 714. Also, the server(s) 700 includes processor(s) 716, a removable storage 718, a non-removable storage 720, transceivers 722, output device(s) 724, and input device(s) 726, any, or all, of which can be communicatively connected via bus 728.

In various examples, system memory 702 is volatile (such as RAM), non-volatile (such as ROM, flash memory, etc.), or some combination of the two. The web server 704 stored in the system memory 702 may provide user interfaces, such as web pages, to communication clients of user devices, such as web browsers. The web pages may be web pages for submitting information to and receiving information from other components of the server(s) 700, such as the account management component 706, authentication component 710, client installer 712, or routing component 714.

The account management component 706 may enable reading to and writing from user accounts 708. The account management component 706 may receive requests to add WebRTC addresses to user accounts 708 and may add those WebRTC addresses to the user accounts 708 based, e.g., on a telecommunication service provider policy or on terms of subscription plans or policies for the users of the user accounts 708. The account management component 706 may also retrieve lists of WebRTC addresses and user devices and preferences associated with a user account 708 and provide those lists and preferences to a user device either directly as a client of the user device or through, for example, the web server 704 or authentication component 710. Further, the account management component 706 may receive updates to the preferences from the user device either directly from the user device client or through, for example, the web server 704 or authentication component 710 and may, in turn, update the user accounts 708.

The user accounts 708 may store profiles for users of the cellular network 104 or WebRTC network 106. Each profile may include, for example, login credentials (e.g., username and password), a list of WebRTC addresses, a list of user devices, mappings of ones of the WebRTC addresses to ones of the devices, the WebRTC call log 318, and preferences.

The authentication component 710 may receive login credentials from a user device through, e.g., the web server 704 or directly from a client of the user device and may authenticate the login credentials based at least on the user accounts 708. The authentication component 710 may then send an indication to the user device through, e.g., the web server 704 or directly to the user device client indicating whether the login was successful. In some implementations, the authentication component 710 may then invoke the account management component 706 to cause the account management component 706 to provide lists of WebRTC addresses, devices, and preferences to the user device, either directly to the user device client, through the web server, or through the authentication component 710. In further implementations, the authentication component 710 may receive indication of a logout either directly from a user device client or through, e.g., the web server 704 and may, in turn, invoke the routing component 714 to cause the routing component 714 to stop routing WebRTC to and from the user device. The authentication component 710 may also invoke the client installer 712 (e.g., the WebRTC client) responsive to the logout to cause the client installer 712 to uninstall a wireless communication application.

The client installer 712 may receive a request through, e.g., the web server 704 of a user device for a wireless communication application. In response, the client installer 712 may install the wireless communication application on that user device. In some examples, the client installer 712 may be invoked by the authentication component 710 upon a logout from a user account to uninstall the wireless communication application from the user device.

The routing component 714 may be invoked by the authentication component 710 and may receive WebRTC addresses and devices from the account management component 706, a user device, or both. The routing component 714 then routes WebRTCs to or from the user device either directly through a client of the user device or through, e.g., web server 704 until receiving an indication from, for instance, the authentication component 710 to discontinue doing so. Such an indication may be provided responsive to a logout. In some implementations, the routing component 714 may also retrieve preferences from the account management component 706 and utilize the preferences in routing RTCs to user devices and to specific handlers or applications on those devices. Such preference-based routing decisions may also involve quality metrics for access networks which the routing component 714 may obtain from other telecommunication network devices or components.

In some examples, the processor(s) 716 is a central processing unit (CPU), a graphics processing unit (GPU), or both CPU and GPU, or any other sort of processing unit described above with reference to processor 716. The server(s) 700 also includes additional data storage devices (removable and/or non-removable) such as, for example, magnetic disks, optical disks, or tape. Such additional storage is illustrated in FIG. 7 by removable storage 718 and non-removable storage 720. System memory 702, removable storage 718 and non-removable storage 720 are all examples of computer-readable storage media. Tangible computer-readable media and computer-readable storage media can be as discussed above with reference to removable storage 718 and non-removable storage 720.

In some examples, the transceivers 722 include any sort of transceivers known in the art. For example, transceivers 722 may include a radio transceiver that performs the function of transmitting and receiving radio frequency communications. Also, or instead, the transceivers 722 may include other wireless or wired connectors, such as Ethernet connectors, wireless modems, or near-field antennas. The transceivers 722 may enable the server(s) 700 to communication with other devices of a telecommunication network or with devices outside of the telecommunication network.

In some examples, the output devices 724 include any sort of output devices known in the art, such as a display, speakers, a vibrating mechanism, or a tactile feedback mechanism. Output devices 724 also include ports for one or more peripheral devices, such as headphones, peripheral speakers, or a peripheral display. In various examples, input devices 726 include any sort of input devices known in the art. For example, input devices 726 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 8:
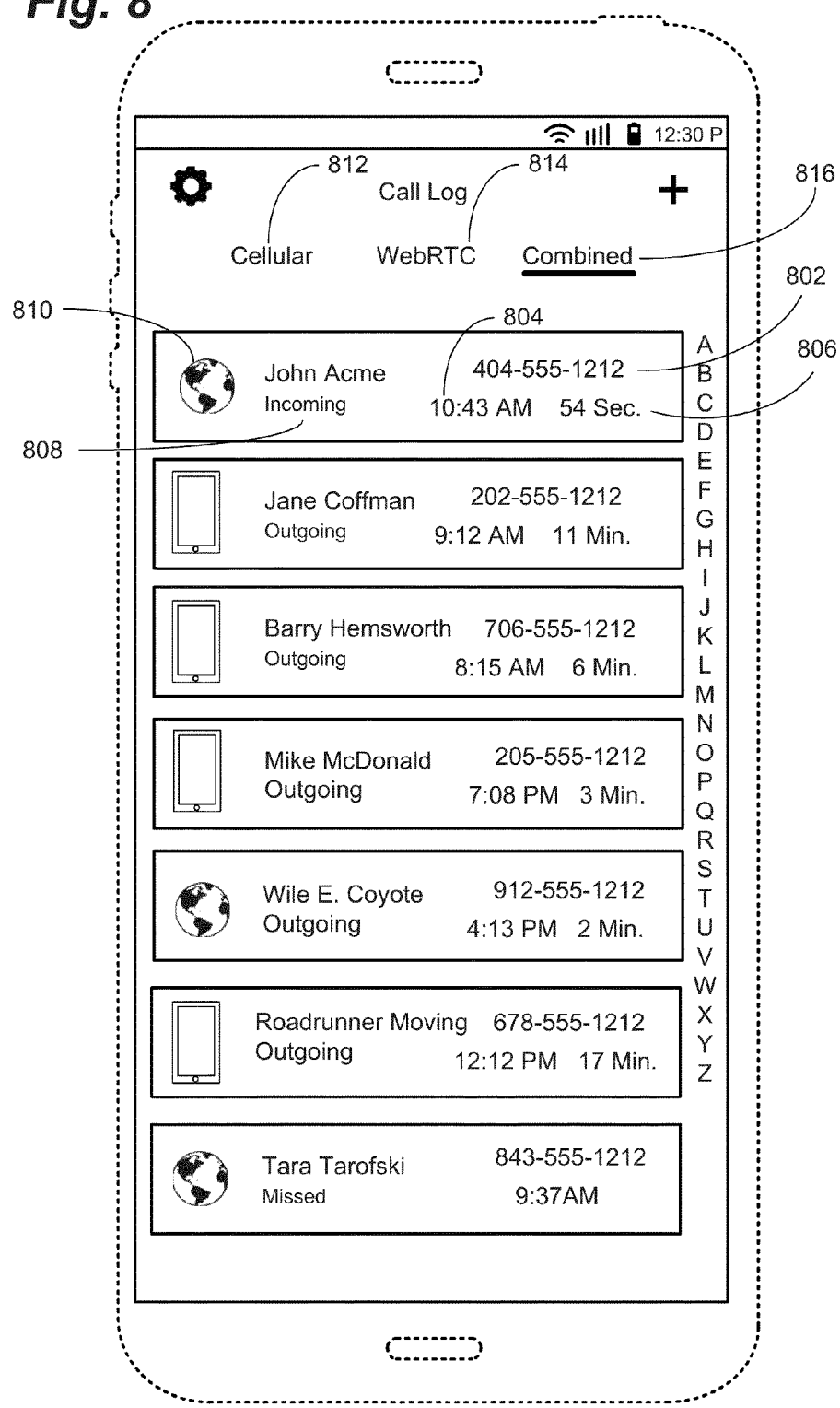
FIG. 8 is an example of a graphical user interface (GUI) for providing a consolidated call log, in accordance with some examples of the present disclosure.

As shown in FIG. 8, examples of the present disclosure can also comprise a graphical user interface (GUI) including a consolidated call log 800. The consolidated call log 800 can be stored on the UE 102, in the app 102a, or on a remote server (e.g., cloud storage 118). In some examples, the call log 800 can include common call log information such as, for example, the number called 802, call time 804 call duration 806, and call type 808 (e.g., incoming, outgoing, missed, etc.). In this case, however, the call log 800 can also include a source identifier 810.

As the name implies, the source identifier 810 can identify the source of the call as cellular or WebRTC, for example. Thus, the source identifier 810 can simply comprise an appropriate descriptor, a symbol or icon, a color, or other suitable means. As shown, the source identifier can include a globe, for example, to denote WebRTC calls via the Internet and a cell phone to denote calls made via the cellular network 104. In this manner, the user can review the call log 800, which includes all types of calls, and can identify the source of the call at a glance. The consolidated call log 800 increases productivity by obviating the need to review multiple call logs in multiple locations. The consolidated call log 800 also prevent confusion associated with trying to remember which calls were cellular calls and which calls were WebRTC calls. As a result, users are free to user either method of communication based on which type of call best suits the need at hand.

In some examples, the consolidated call log 800 can include multiple tabs 812-816. The tabs 812-814 can enable the user to switch between the cellular call log 216, the WebRTC call log 318, and the consolidated call log 800. Thus, the cellular tab 812 can include only calls over the cellular network 104, the WebRTC tab 814 can include only calls made over the WebRTC client (or other VoIP calls), and the combined tab 816 can include all calls. In this manner, the user can review all calls together, or can narrow a search down, for example, when the type of call is known. The consolidated call log 800 can also be sortable E.g., by name, date, duration, etc.) and searchable to provide additional functionality.

The app 102a and methods 400, 500 described above provide a simple, robust, and easily installed communications link between cellular call logs 216 and WebRTC call logs 318. Thus, the app 102a can enable users to review a single call log, for example, that includes both types of calls, improving productivity and reducing confusion. Users may wish to take advantage of VoIP calls to reduce long distance or international charges, for example, but nonetheless would like all calls (cellular and WebRTC calls) logged in a common call log (or both call logs 216, 318).

While several possible examples are disclosed above, examples of the present disclosure are not so limited. For instance, while the systems and methods have been disclosed for use with cellular and WebRTC communications, the systems and methods can be used with other types of wireless data and communications system. Thus, the systems and methods described herein can be used with Wi-Fi systems, microwave, citizen band (CB), family radio service (FRS), general mobile radio service (GMRS), future 5G communication systems, or other systems, in which a consolidated call log is useful. Additional, or different, system components, such as the servers 112, 306, 308, routers, and other components could also be used.

In addition, the location and configuration used for various features of examples of the present disclosure such as, for example, the order of the steps used, the components of the system, the locations of the carious servers 112, 306, 308, the types of clients and connections used, and other features can be varied according to a particular communications network, for example, or a particular location that requires a slight variation due to, for example, local communications regulations or interference sources, among other things. Such changes are intended to be embraced within the scope of this disclosure.

The specific configurations, connections, and the size and shape of various networks can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   receiving, at a web real-time communications (WebRTC) server, a cellular call log from an application ("app") on a user equipment (UE), the cellular call log comprising a log of cellular calls associated with a user;
   sending, from the WebRTC database server to a WebRTC client associated with the user, the cellular call log; and
   combining, at the WebRTC client, the cellular call log with a WebRTC call log to form a consolidated call log, the WebRTC call log comprising a log of WebRTC calls associated with the user;
   sending, from the WebRTC client to a user equipment (UE), the consolidated call log to cause the UE to display the consolidated call log including a first identifier and a second identifier;
   wherein the first identifier is displayed for WebRTC calls in the consolidated call log; and
   wherein the second identifier is displayed for cellular calls in the consolidated call log.

2. The method of claim 1, wherein sending, the cellular call log from the WebRTC database server to a WebRTC client comprises sending the cellular call log to a plurality of WebRTC clients on a plurality of UE associated with the user.

3. The method of claim 1, further comprising:
   reading, with the app, the cellular call log from a memory on the UE.

4. The method of claim 1, further comprising:
   reading, with the app, the cellular call log from a cloud storage server associated with the user.

5. The method of claim 1, further comprising:
   displaying, with a graphical user interface (GUI) associated with the WebRTC client, the consolidated call log;
   wherein the GUI comprises the first identifier to identify the WebRTC calls and the second identifier to identify the cellular calls in the consolidated call log.

6. A method comprising:
   receiving, at a server associated with a cellular network, a web real time communications (WebRTC) call log associated with a user from a WebRTC database server; and
   sending, from the server associated with a cellular communications network to a user equipment (UE) associated with the user, a file containing the WebRTC call log; and
   wherein the UE updates a cellular call log, comprising a log of cellular calls associated with the user, with the WebRTC call log, comprising calls made by the user using a WebRTC client, to form a consolidated call log to display on a graphical user interface (GUI) on a display of the UE;
   wherein the GUI comprises a first icon to identify WebRTC calls in the consolidated call log; and
   wherein the GUI comprises a second icon to identify cellular calls in the consolidated call log.

7. The method of claim 6, wherein sending the file containing the WebRTC call log to the UE comprises sending an Apple Push Notification Service (APNS) message to the UE.

8. The method of claim 6, wherein sending the file containing the WebRTC call log to the UE comprises sending a Google Cloud Messaging (GCM) message to the UE.

9. The method of claim 6, further comprising:
   receiving, at the WebRTC database server, the WebRTC call log from a WebRTC client located on a UE associated with the user.

10. The method of claim 9, further comprising:
    downloading, with the WebRTC client, the WebRTC call log from a cloud storage server associated with the user.

11. The method of claim 9, wherein receiving the WebRTC call log from a WebRTC client located on a UE associated with the user comprises receiving WebRTC call logs from a plurality of UE associated with the user.

12. A user equipment comprising:
    a display;
    one or more input devices to receive inputs from the user;
    one or more transceivers to send and receive one or more wireless transmissions;
    one or more processors in communication with at least the display, the one or more transceivers, and the one or input devices; and
    memory storing an application ("app") that, when executed, causes the one or more processors to:
       receive, from the one or more transceivers, a first file from a first server associated with cellular network, the first file comprising a web real-time communications (WebRTC) call log, the WebRTC call log comprising a log of calls made via a WebRTC client associated a user;
       retrieve at least a first portion of a cellular call log from the memory of the UE; and
       combine the WebRTC call log and the first portion of the cellular call log into a consolidated call log, the cellular call log comprising a log of calls made via the cellular network; and
       display the consolidated call log on a graphical user interface (GUI) on the UE;
    wherein the GUI comprises a first tab that, when selected, displays only WebRTC calls in the consolidated call log; and
    wherein the GUI comprises a second tab that, when selected, displays only cellular calls in the consolidated call log.

13. The UE of claim 12, the app further causing the one or more processors to:
    display, with the display, a graphical user interface (GUI) comprising the consolidated call log.

14. The UE of claim 13, wherein the GUI comprises:
    a first icon to identify calls from the WebRTC call log; and
    a second icon to identify calls from the cellular call log.

15. The UE of claim 12, the app further causing the one or more processors to:

parse the file comprising the WebRTC call log to at least one of:
  remove call log categories not used in the consolidated call log; or
  format the WebRTC call log into a format compatible with the consolidated call log.

16. The UE of claim 12, the app further causing the one or more processors to:
  send, with the one or more transceivers, the cellular call log to a WebRTC database server associated with the user;
  wherein the WebRTC database server sends the cellular call log to a WebRTC client associated with the user to enable the WebRTC database server to compile the consolidated call log.

17. The UE of claim 12, the app further causing the one or more processors to:
  receive, from the one or more transceivers, a second file from a second server associated with the cellular network, the second file comprising at least a second portion of the cellular call log;
  wherein the second server is a cloud-based storage server.

18. The UE of claim 12, wherein the GUI comprises a third tab that, when selected, displays both WebRTC calls and cellular calls in the consolidated call log.

* * * * *